US006959862B2

(12) United States Patent
Neumark

(10) Patent No.: US 6,959,862 B2
(45) Date of Patent: Nov. 1, 2005

(54) INVENTORY CONTROL AND IDENTIFICATION METHOD

(76) Inventor: Yoram Neumark, 273 Giotto, Irvine, CA (US) 92614

( * ) Notice: Subject to any disclaimer, the term of this patent is extended or adjusted under 35 U.S.C. 154(b) by 0 days.

(21) Appl. No.: 10/443,600

(22) Filed: May 21, 2003

(65) Prior Publication Data

US 2004/0099735 A1 May 27, 2004

Related U.S. Application Data

(63) Continuation-in-part of application No. 10/304,671, filed on Nov. 25, 2002, now Pat. No. 6,736,316.

(51) Int. Cl.[7] .............................................. G06K 15/00
(52) U.S. Cl. ......................... 235/385; 235/383; 705/28; 340/573.1
(58) Field of Search ................................ 700/215, 225, 700/226, 213, 214; 600/300; 235/375, 383, 384, 385; 705/22, 28; 340/572.1, 572.4, 825.36, 14.1, 505, 573.1, 825.49, 10.42; 342/450, 42, 50, 451, 463, 465

(56) References Cited

U.S. PATENT DOCUMENTS

| | | | |
|---|---|---|---|
| 5,794,215 A | | 8/1998 | Goodwin, III ................ 705/26 |
| 5,995,015 A | | 11/1999 | DeTemple et al. ..... 340/825.49 |
| 6,016,481 A | | 1/2000 | Failing, Jr. et al. ........... 705/28 |
| 6,046,682 A | * | 4/2000 | Zimmerman et al. .. 340/825.49 |
| 6,105,004 A | | 8/2000 | Halperin et al. ............... 705/28 |
| 6,253,190 B1 | | 6/2001 | Sutherland .................... 705/20 |
| 6,269,342 B1 | | 7/2001 | Brick et al. .................... 705/20 |
| 6,318,636 B1 | * | 11/2001 | Reynolds et al. ...... 235/472.01 |
| 6,424,264 B1 | * | 7/2002 | Giraldin et al. ........... 340/573.1 |
| 6,497,656 B1 | * | 12/2002 | Evans et al. ................. 600/300 |
| 6,550,674 B1 | | 4/2003 | Neumark ..................... 235/383 |
| 6,557,760 B2 | * | 5/2003 | Goodwin, III .............. 235/383 |
| 6,584,449 B1 | * | 6/2003 | Otto ............................. 705/20 |
| 2001/0020935 A1 | | 9/2001 | Gelbman ..................... 345/173 |
| 2001/0054005 A1 | | 12/2001 | Hook et al. ................... 705/20 |
| 2002/0008621 A1 | | 1/2002 | Barritz et al. ............. 340/572.1 |
| 2002/0143635 A1 | * | 10/2002 | Goodwin, II ................ 705/22 |
| 2002/0147649 A1 | * | 10/2002 | White .......................... 705/20 |
| 2002/0167417 A1 | * | 11/2002 | Welles et al. .......... 340/825.49 |
| 2004/0108954 A1 | * | 6/2004 | Richley et al. ............. 342/387 |

FOREIGN PATENT DOCUMENTS

JP          2001-5872 A    *   1/2001

* cited by examiner

*Primary Examiner*—Jared J. Fureman
(74) *Attorney, Agent, or Firm*—Gene Scott; Patent Law & Venture Group

(57) ABSTRACT

An inventory control and identification apparatus uses a storage space with a plurality of inventory items. Identification labels are positioned in physical correspondence with the inventory items. Each of the identification labels provides a transceiver. A coordinate communications network of further transceivers is set in a fixed position relative to the storage space and is enabled for wireless communication with the identification labels. A data processor is enabled for wireless communication with the coordinate network and the identification labels so as to receive data from the labels and the network. Inventory items have RF ID tags. Interrogation by the labels enables the tags to emit codes identifying the presence and location of the inventory to the labels. Triangulation of signals transmitted by the labels enables location of the labels in three-space.

2 Claims, 4 Drawing Sheets

INVENTORY CONTROL AND IDENTIFICATION METHOD

RELATED APPLICATIONS

This is a continuation-in-part application of a prior filed and currently pending application having Ser. No. 10/304,671 and file date of Nov. 25, 2002 now U.S. Pat. No. 6,736,316.

INCORPORATION BY REFERENCE

Applicant(s) hereby incorporate herein by reference, any and all U.S. patents, U.S. patent applications, and other documents and printed matter cited or referred to in this application.

BACKGROUND OF THE INVENTION

1. Field of the Invention

This invention relates generally to inventory identification and control systems and more particularly to a system using inventory identity labels mounted adjacent to inventory items, the labels providing identification information relative to the inventory and wherein the labels are enabled for communication with tags on the inventory items and with a computerized inventory management system, and wherein the inventory location, quantity and status is known at any time from a remote location.

2. Description of Related Art

The following art defines the present state of this field:

Neumark, U.S. Pat. No. 6,550,674 describes an inventory control and management method providing a combination mobile device for communication and for reading labels (R&C). The R&C reads an inventory label affixed to an item of inventory in the stores. A data file is created corresponding to the label reading and includes a time stamp taken at the time of the reading. The data file is imported into a computer data processor. A network of fixed distributed communication nodes (transceivers) is positioned over the inventory store for receiving temporal cyclic signature pulses from the R&C. At least three of the communication nodes are used to perform a triangulation for locating the R&C, and the location and the corresponding time is recorded. By comparing the time of a given reading of the label with a corresponding time of the triangulation, it is possible to determine where any item is located within the stores.

Barritz et al, U.S. 2002/0,008,621 describes a system and method which allows the identity of assets and their physical locations to be mapped and associated with one another. The invention includes a locator tool which receives an input which allows the tool to determine its own spatial location and thereby the spatial locations of various objects such as furniture, computer equipment, and structural components such as doors, windows to be identified and located and thereafter mapped in the form of architectural layout, diagrams, and the like. The invention is also an inventory system as well as a verification system that allows objects or assets to be inventoried, tracked, or verified against purchasing lists or the like.

Goodwin, III, U.S. Pat. No. 5,794,215 describes a method of optimizing electronic price label (EPL) systems which employs a three-dimensional graph of retry levels in a transaction establishment. The method includes the steps of determining locations of EPLs within the transaction establishment, determining locations of transmit and receive antennas that are used by a computer to communicate with the EPLs, determining retry levels for the EPLs, mapping the retry levels to locations within the transaction establishment, producing a three-dimensional graph of the retry levels within the area of the transaction establishment, and determining, from the graph, sub areas within the area having retry levels above a predetermined maximum retry level. Once the sub areas having higher retry levels are determined, the locations of the transmit and receive antennas may be changed and/or interfering structures may be moved until the retry levels of the sub areas are below the predetermined maximum retry level.

DeTemple et al., U.S. Pat. No. 5,995,015 describes a system for communicating between a store computer and locations in the les of a retail facility. A hard-wired grid connects the store computer to a plurality of transceivers located in zones throughout the facility and the transceivers establish a wireless link to the locations. One embodiment is a product information display system in which the locations are fixed information display terminals, such as price displaying shelf tags. Another embodiment is an item tracking system, in which the locations are movable shopping carts or baskets.

Failing, Jr. et al., U.S. Pat. No. 6,016,481 describes an improved system for space management in retail stores. The space management system includes price display labels mounted on rails along the edges of shelves in a store. A communications link between the computer and the labels permits the computer to address each label by a logical address and to determine the physical location of each label to within a resolution of typically four feet. The system prepares price audit lists and adjacency audit lists that permit economical use of the time of store personnel during the audit. The lists are generated in such a way that the items on a particular list are physically contiguous; thus once the correct general area has been located by the auditor little additional time need be spent locating the individual items. In performing an audit of product facings, the user is able to use the display hardware, including the pushbutton on each label, as a data collection system for product facing information. In product location mode, the user starts at the first label at one end of a shelf and presses the button on the first label. The user moves to the second label, presses its button, moves to the third label, and the process is repeated for each label along the shelf, and for the rest of the shelves in the area being audited. This permits the system to collect information as to the sequence of labels along a rail.

Halperin et al., U.S. Pat. No. 6,105,004 describes a product monitoring system for monitoring a variety of products grouped according to their identities on shelves, including a central computer storing the identification of each group of products on the shelves; a plurality of electronic shelf labels, each located adjacent to a shelf for a group of products, communicating with the central computer, storing the identification of the respective group of products, displaying information relating to the respective group of products, and reading out the identification of the respective group of products; a plurality of portable units each to be carried by a user of the system; and a record memory for each portable unit. Each portable unit includes a read-in device capable of establishing a short-range communication link with the read-out device of each electronic shelf label for reading in the product identification and for recording same in the record memory for the respective portable unit.

Sutherland, U.S. Pat. No. 6,253,190 describes a shelf tag comprising a liquid crystal display having optical states which are stable without power and an interface that allows for each character element to be programmed easily by sweeping a programming device across the character element contacts with all power and signal requirements being supplied to the shelf tag by the programming device. The programming device can be integrated with a portable transaction computer equipped with a bar code reader or can be embodied in a stand-alone apparatus capable of receiving user input, displaying information and interfacing to the shelf tags. A method of using the shelf tags, the programming device and a radio frequency computer local area network are presented which automates many typical business applications such as inventory updating and simultaneously changing prices advertised on the shelf tags.

Brick et al., U.S. Pat. No. 6,269,342 describes an electronic pricing and display system using programmable electronic shelf tags. Programmable electronic shelf tags are used in connection with apparatus for programming the electronic shelf tags. Pricing and product information is stored in databases of a computer system for such purposes as inventory control and updating pricing information. A portable programming device is used to transmit programming data Methods are provided for fast and convenient modification of large numbers of electronic shelf tags located throughout a facility (e.g., a retail store).

Gelbman, U.S. 2001/0,020,935 A1 describes smart and dumb implementations of a stand-alone, remotely updateable, remotely alterable, flexible electronic label. The electronic label provides for displaying information in connection with a mammal, non-mammal, an item or location. The label includes a display assembly having electronic ink disposed on a support, one or more antennas for sending or receiving signals corresponding to one of instructions, programs, data or selected indicia to be displayed by said display assembly, a storage element in circuit with the antenna for storing the instructions, programs, data and indicia, and one or more processors for intelligently determining the indicia to be displayed by the display assembly, for controlling and coordinating operation of the label, and for generating output signals for instructing the display assembly to display the indicia.

Hook et al., U.S. 2001/0,054,005 A1 describes an electronic display tag system. The system has an electronic display tag including a display for displaying at least one of pricing data and product identification data, the display having bistable character elements or bistable pixels. The display tag has a decoder logic unit for decoding received programming data and for updating the display based on the programming data, the programming data being received wirelessly. The display tag also has a wireless transceiver, the wireless transceiver for converting a power-inducing signal transmitted wirelessly to the display tag into electrical power, the electrical power used by the decoder logic unit to update the display.

Visible Tech-Knowledgy, LLC, WO 02/063602 describes smart and dumb implementation of a stand-alone, remotely updateable, remotely alterable, flexible electronic label. The flexibility of the electronic label allows the label to fit into and conform to the shape of the molding used in retail store shelving to display merchandize and warehouse shelving. The flexible, thin label includes a flexible display assembly having electronic ink disposed on a support, one or more antennas for sending or receiving signals corresponding to one of instructions, programs, data or selected indicia to be displayed by the display assembly, a storage element in circuit with the antenna for storing the instructions, programs, data and indicia, and one or more processors for intelligently determining the indicia to be displayed by the display assembly, for controlling and coordinating operation of the label, and for generating output signals for instructing the display assembly to display the indicia.

The prior art teaches a smart electronic label employing electronic ink, a programmable shelf tagging system, a method of optimizing electronic price label systems, a remote electronic information display system for retail facilities, a space management system for retail stores, a product monitoring system, a programmable shelf tag and method for changing and updating shelf tag information, and a programmable shelf tag and method for changing and updating shelf tag information. However, the prior art does not teach a smart label with two-way radio communication capability for use in a three-space locating system. The present invention fulfills these needs and provides further related advantages as described in the following summary.

SUMMARY OF THE INVENTION

The present invention teaches certain benefits in construction and use which give rise to the objectives described below.

The present invention uses a network of ultra wide band (UWB) units capable, as a group, of precisely locating objects in three-dimensional space as described in U.S. Pat. Nos. 6,400,754 and 6,385,268 to Fleming, and U.S. Pat. No. 6,300,903 to Richards. These "units" are able to determine their locations in reference to a give point in space. Miniature units may be built into electronic shelf labels as will be described below. Once activated, these Units become part of a UWB network. Such networks may comprise a wired or wireless simplex or full duplex electronic labeling system and is advantageously employed in stores and retail establishments. Each Unit is attached to an individual label; has its own address and the label displays data received from a source such as a computer system. Typically such information will include any of: description of an item, unit price, price per weight unit, quantity in stock, special promotions, etc. In duplex systems the label responds with an acknowledgement when addressed.

The primary purpose of the present invention is to incorporate the information displayed in such an electronic labeling system with the ability to determine the accurate location of each label and to provide an interactive data storage capability, that includes not only the data displayed by the label but also its location. This enables a virtual map of a storage facility such as a retail store and provides significant advantages. A further purpose of the present invention is to identify the quantity of each item in storage upon interrogation.

Such a system reduces the stocking process cycle time, cuts down on new store setup-time, improves stocking issues such as over or under stocking, and enables users to locate a specific stock item quickly. For on line shoppers, or from a store kiosk, locating items is very easy.

Transceivers are matched to labels and attached to shelves to identify specific stock items. The transceivers communicate so as to determine current location, as described in the prior art. Each label displays information pertaining to a specific stock item. Communication with the computer system to update the database with current location is easily accomplished. Such updates can be performed on a regular schedule, when a unit detects a change in its location or per user request when trying to locate a specific item.

All physical fixtures, i.e. shelves, hooks, displays etc. are mapped as to exact size and location in the database. This results in the ability to create a "virtual" store layout.

The present invention is an inventory control and identification system and method for use in large inventory stores such as warehouses and retail establishments containing thousands of items. Such items may be of any type, such as automobiles, tires, hardware, tools, foodstuffs, and so on, and may be stored in a two-dimensional array, such as with automobiles on a sales lot, or in a three-dimensional array (in three-space) such as in aisles having racks.

A primary objective of the present invention is to provide a system and method of use that provides advantages not taught by the prior art.

Another objective is to provide such an invention capable of recording the nature, quantity and location in three-space, of items in an inventory stores.

A still further objective is to provide such an invention capable of confirming status of inventory remotely and with high accuracy.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 2:
FIG. 2 is a perspective view of an information label of the invention.
Figure 3:
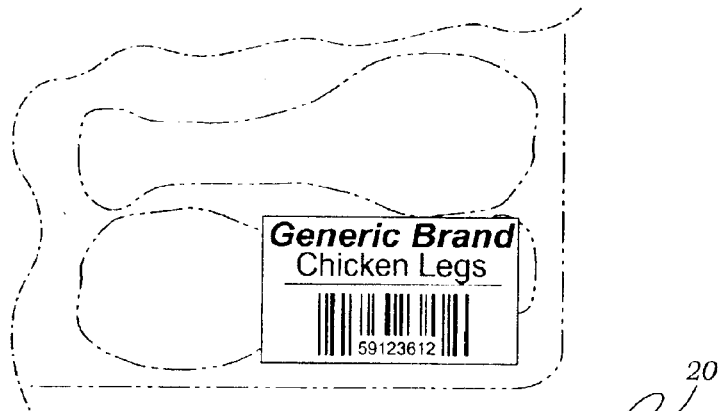
FIG. 3 is a top plan view of a portion of a retail product having a conventional label with bar-code identifier and which is shown to correspond to the label of FIG. 2.

The present invention is a system and method for the identification of inventory stocks wherein the location and identity of any stock may be determined and its identity tag changed; all from a remote location. The system is also able to determine how much inventory is held at each location, shelf or bin, and transmit such information to data storage. The system uses a storage space 10, such as a warehouse, a supermarket, a parking garage, and a dead storage facility, and may be plural storage spaces 10 within a building, for instance, such as on different floors, or may even be in separate facilities. The storage space 10 receives a plurality of inventory items 20 (stock) such as packages, food containers, vehicles and discarded obsolete equipments; and may be any other type of item or item groups that are able to be sorted, stocked and identified. Storage space identification labels 30, referred to throughout as simply "labels," are preferably rectangular in shape, but may be any shape, with a front display face 32 and a means for mounting 34, such as the track engagement device shown in FIG. 2, and as is well known in the supermarket industry. The mounting means 34 engages a receiver 36, such as the track shown in FIG. 4. The labels 30 are positioned in physical correspondence with the inventory items 20. Each of the labels 30 provides a label tranceiving means 40 such as a miniature wireless radio frequency receiver and transmitter, as is well known in the art, and a presentation means 50 such as an electronic pictorial display, as for instance, a liquid crystal display, also well known in the art. The presentation means 50 appears on the front display face 32 of the label 30. This is clearly shown in FIG. 2.

A coordinate communication network provides a means for network tranceiving 60 and is particularly comprised of plural radio frequency receivers and transmitters with UWB tranceiving capability, and is mounted in a fixed position and orientation relative to the storage space 10. The network tranceiving means 60 is enabled for wireless communication with the label tranceiving means 40, and also with a data processing means such as a computer system 50, which is enabled for wave energy signal communication with both the label tranceiving means 40 and network tranceiving means 60. The display face 32 is enabled for presenting pictorial representations of the inventory items 20 such as descriptions related to the inventory items, to provide identification and selection thereof. See FIG. 2.

In use, the system transmits wireless signals from the data processing means 50 to the label tranceiving means 40; the signals corresponding to, and causing the pictorial representations of the inventory items to be displayed. Signals are sent, on demand, from the label tranceiving means 40 to the data processing means 50 to confirm satisfactory operation of the identification labels as well as the specific information being displayed. The labels 30 are located in 3-space through a triangulation method using the coordinate network 60 as will be described in detail below.

To accomplish its objectives, communication in the present invention transmits digital information over relatively short distances, as allowed by FCC rules, employing a well known digital wireless communication technique as described in the prior art. Particularly, this wireless transmission of information is accomplished using low power, ultra wide band (UWB) communication signals which are particularly suitable in the present application, as will be shown. Other communication protocols that are well known in communication engineering could be used in place of UWB, but as stated, UWB has particular application here. Such communicating apparatus is so well known as to be easily duplicated in the present invention by those of skill in the art and is fully described in the incorporated references.

A common need in inventory management is to determine the nature or identity of inventory items and also their location, and the present methods can accomplish this economically and efficiently. A data file or database 52 is established in the computer system 50, and this file corresponds to the information displayed by labels 30. This step is known, for instance, in the supermarket and grocery trade, each time an item is scanned at a checkout counter, its identity is recorded in a data file, which is then imported into a database and the current known inventory count of the item is reduced by one. Similarly here, the data file is transmitted by wireless communication, as described above and shown in FIG. 1, from the labels 30 to the computer system 50. In like manner, triangulation data signals are preferably sent by wireless means, or wire means 62 to the computer system where label 30 location information is then stored as records. Such a record, beside location information, will contain information such as, item description, item serial or stocking number, item count or quantity, item date, and so on. The record also contains the date and time of day that the reading took place. The data base may contain hundreds, or many hundreds of such records, and the means for creating such a database and of importing information, such as described here, is very well known in the art.

The coordinate network 60 is a plurality of fixed distributed communication nodes positioned over or near the inventory items 20. Each of the communication nodes, as previously described, is preferably an electrical signal unit device with antenna, capable of both receiving and transmitting wireless electrical signals. Such devices are extremely inexpensive when employed for low power and limited range applications. The number of nodes required in the present method will depend upon the size of the inventory stores, the output power, signal to noise ratio in the communication channel space, and other factors well known to communications engineers. Physically, the nodes may be mounted on or from a ceiling of a warehouse, or other building structure, or may be mounted on a network of wires strung or hung from a ceiling or from poles in an indoor or out of doors stores and this is well known in the art. In the preferred embodiment, shown in FIG. 1, the nodes are wireless transceivers interconnected by electrical conductors 62 for sharing information. The wireless transmitted signals are able to use ultra low power, being transmitted at roughly four orders of magnitude below typical output power rating for conventional RF transmissions. By precisely timing these transmissions, and by using matched antennas at the nodes, highly efficient communication is possible, as is described in the references. Because a wide spectrum is used, the UWB technique is only able to be employed locally to avoid interference with common carriers. On the other hand, such UWB signals are typically immune to local interference which takes up only a small portion of spectrum. As stated, the UWB signals are received by any of the nodes that are within range of a signal. Location information contained in the UWB signals is sent to the computer system 70 where such information from at least three nodes, enables the determination of the location of specific labels 30 in three-space through triangulation technique. In one embodiment, the triangulation method for locating the labels 30 uses discrimination of received time of the signature signals to determine location. This approach requires that the clocks of the nodes are synchronized.

The process proceeds as follows: the computer system 50 transmits a location request signal with a label identification code. All of the labels 30 receive this request signal. The label 30 that corresponds to the identification code responds by transmitted a short burst signal containing the label's identification code and a time stamp, i.e., time of transmission. All other labels 30 do not respond. Each of the fixed nodes that are within range of the responding label 30 receives the label's signal burst and upon receipt time stamp the burst. The label's and the node's time stamps are then transmitted to the computer system 50 for computation. Since the exact locations of the nodes is known, and the time of flight of the label's signal burst is able to be easily calculated from the time stamps, the exact location in 3-space of the label 30 is calculated. Since the entire process takes on the order of a tens of microseconds, a complete inventory of thousand of labels 30 may be located in a few seconds.

As an example of this triangulation technique, the location of label 30 (any one of the many labels in the apparatus) is determined when label 30 is caused to emit a short burst of energy, e, at time $t^0$. This burst is in response to a signal request from the computer system 50. The burst, e, carrying its signature, "id", is received by at least three nodes 1, 2 and 3 (second transceiver means 60) whose locations are exactly defined in the inventory space. The instant in time that the nodes receive e is identified, i.e., the nodes have clocks on board and the instant a signal is received is noted by such clocks, the time being attached digitally to the signature of the signal received. In the present case, the receipt times are $t^{1'}$, $t^2$ and $t^3$ respectively. Assuming that the three nodes are at different distances from the label 30, these three times will be distinct. The computer system 50 may not know that e was emitted depending on the ability of receiver 54 to pick up this low energy signal. However, since the burst e contains the time stamp $t^0$ each of the three nodes is able to read the initial time stamp and transmit, by cables 62: $t^0$ $t^1$ and $t^0$ $t^2$ and $t^0$ $t^3$ to the computer system 50. Since the velocity of propagation, v, of the signals through space is known, the distance of the label 30 from each of the nodes is calculated as: $d^1 = v/t^1 - t^0$ and $d^2 = v/t^2 - t^0$ and $d^3 = v/t^3 - t^0$. Now, by defining circles about nodes 1, 2 and 3 with radiuses equal to $d^1$, $d^2$ and $d^3$ respectively, the location of label 30 is known by the point of intersection of the circles. This calculation is easily carried out on the computer system 50 as is well known in the art and is highly accurate.

Alternately, the triangulation method may use signal direction discrimination of the signature signals to determine location. This approach uses antenna systems that are able to distinguish within small tolerances, the direction from which a signal is received and is well known in the art. Again a triangulation is accomplished from label's burst signal. The foregoing discussion uses equipment, parts and techniques that are well known in the art.

The present invention makes it possible to access the current information presented by any of many thousands of labels 30, make changes to the label's display or shut the label off.

Figure 1:
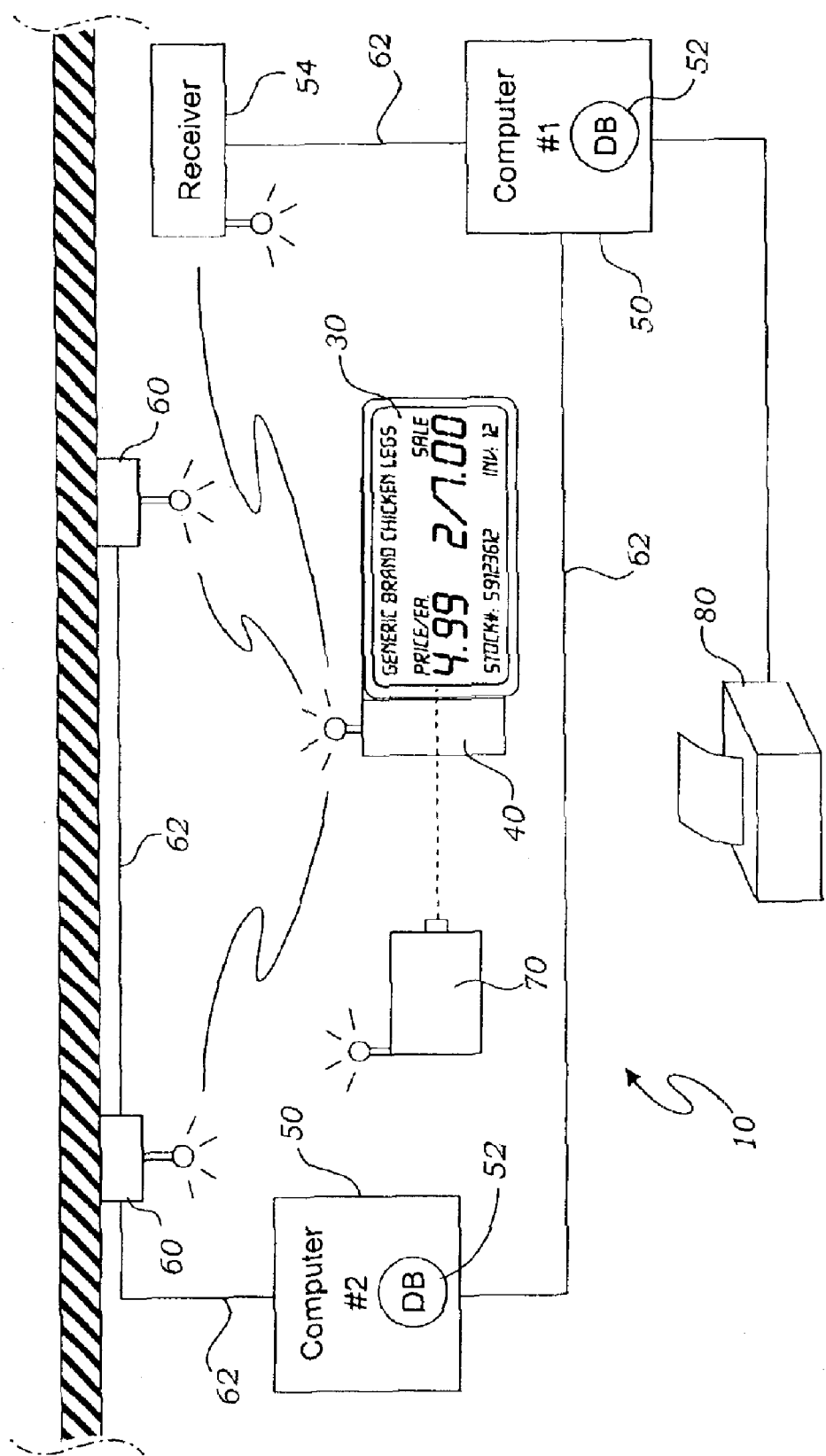
FIG. 1 is a conceptual diagram of the preferred embodiment of the invention.
Figure 5:
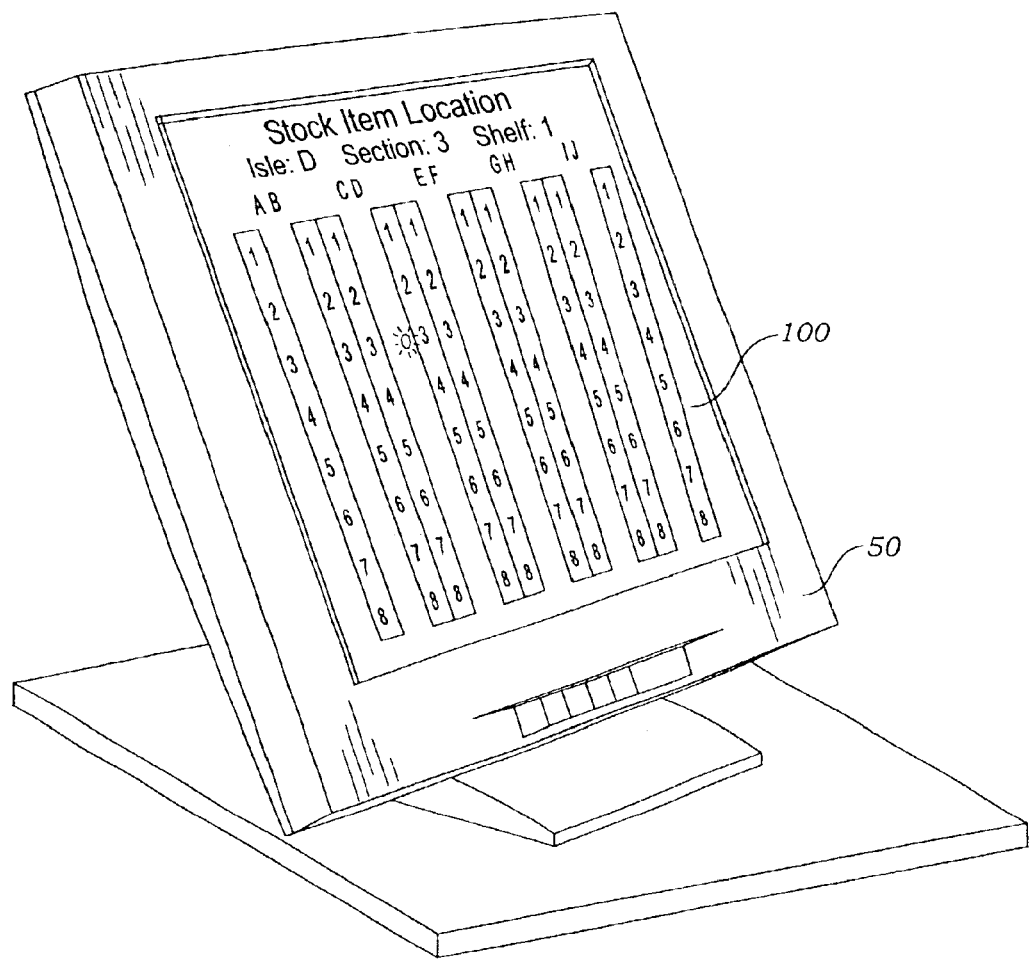
FIG. 5 is a data processor computer display showing stocked item locations in accordance with the invention.

The present method further comprises the step of composing a pictorial map 100, as shown in FIG. 5, of the inventory items in the storage space, as derived from the calculated locations of the labels 30. Such computer graphic maps are well known in the art. The method further comprises the step of identifying any one of the labels 30 on the pictorial map by an indication as shown in FIG. 5 at column "D," line 3, on the map 100. Such a map may be printed, as shown in FIG. 1, and placed for use by employees, customers, etc.

Figure 4:
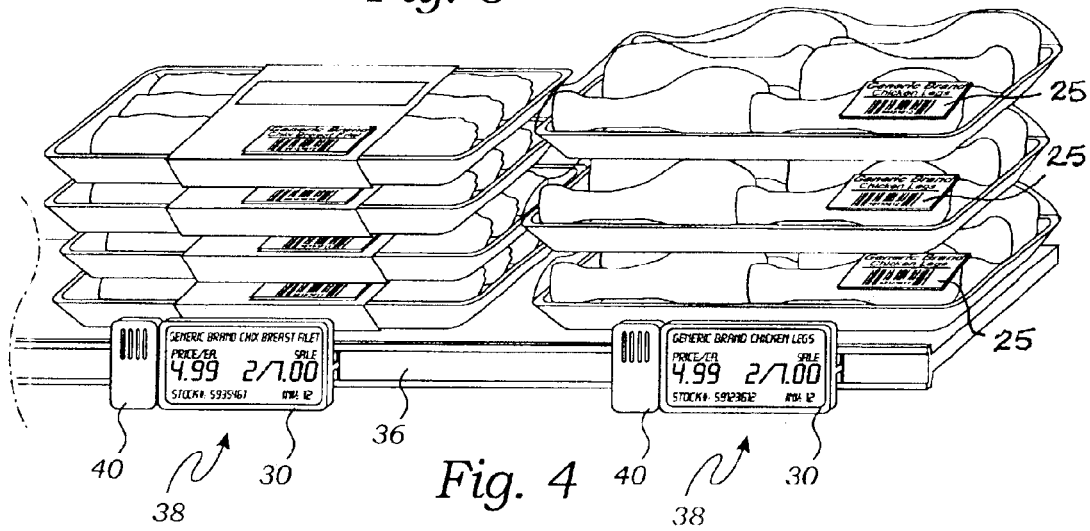
FIG. 4 is a perspective view of the retail product on a shelf with the information labels mounted on the front of the shelf.

From the above description it is seen that the present inventory control and identification apparatus includes plural storage spaces such as that shown in FIG. 4, where each of the plural storage spaces engages at least one inventory item 20 and preferably more than one. The a storage space identification label 38 is positioned adjacent to each of the storage spaces, and each said storage space identification label provides the label tranceiving means 40. As shown in FIG. 1, the means for network tranceiving established as an ultra-wide band coordinate communication network in a fixed position relative to the storage spaces. The label tranceiving means 40, the network tranceiving means and the means for data processing 50 is established for mutual wave energy communication. Each inventory item 20 provides a radio frequency identification tag 30 enabled for emitting a wireless identity transmission upon exposure to a wireless radio frequency interrogation transmission from label tranceiving means 40, or from a remote transmitter (not shown). The method of this invention comprises emitting radio frequency interrogation transmissions from the storage space's label tranceiving means 40, preferably one at a time, receiving, at the label tranceiving means 40, a wireless identity transmission from each one of the radio frequency identification tags 25 which are positioned on each one of the plurality of inventory items 20, and then determining inventory quantities and locations from the wireless identity transmissions. As previously defined, triangulation locates the storage space identification labels 30 using the coordinate communication network. Inventory is updated as to quantity and location in the database of the data processing means 50. Clearly, the inventory item tags 25 may be enabled for transmitting an identity specific code so that the label tranceiving means 40 will receive only transmissions from inventory associated with each specific label tranceiving means 40. This is easily accomplished by simple signal filtering. Also, the distance between a given label tranceiving means 40 and its associated inventory tags 25 is easily computed by identifying the time between the emitting of the interrogation signal and the receipt of the several identity transmission responses.

Figure 6:
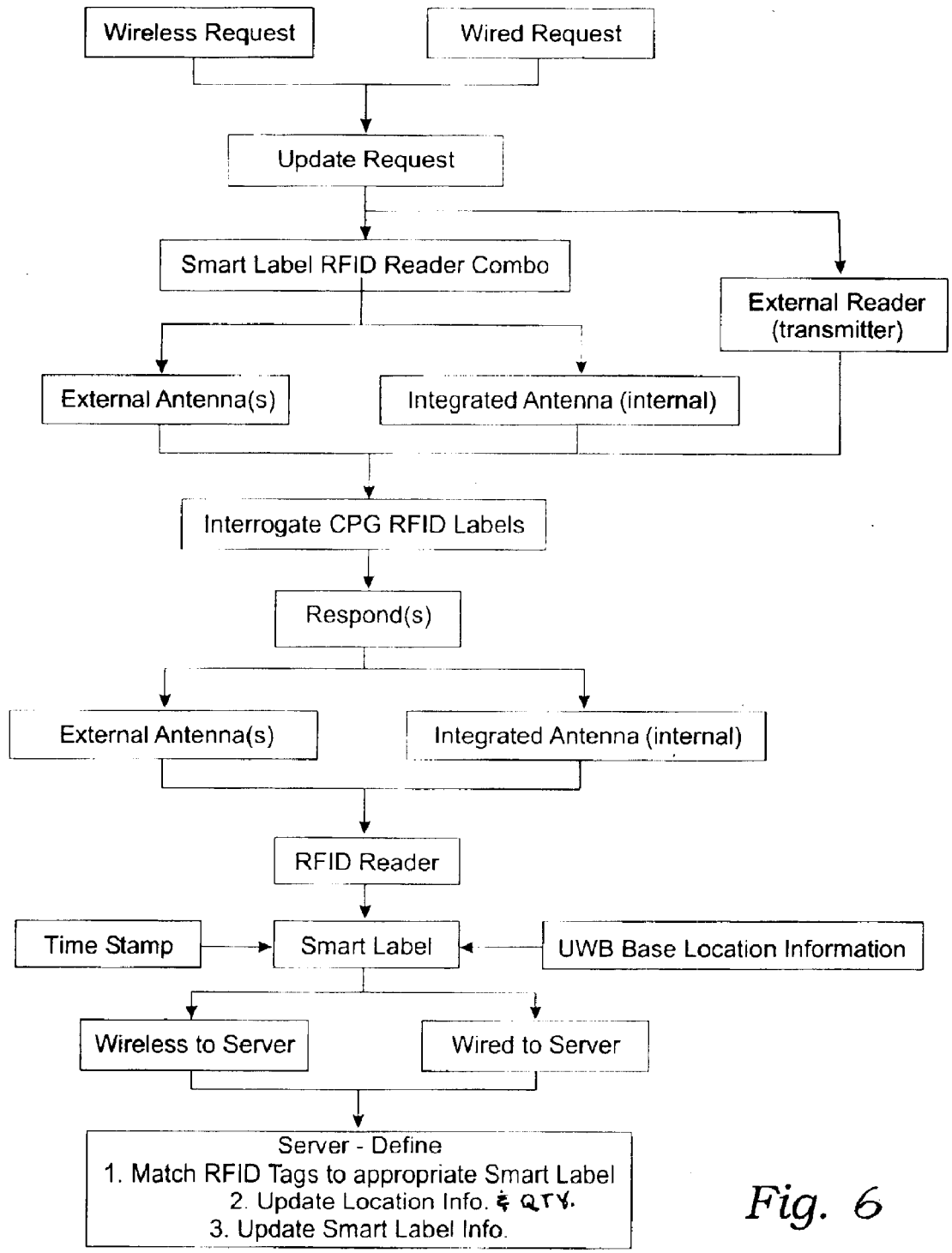
FIG. 6 is a logic flow diagram illustrating the method of the present invention.

In FIG. 6 is illustrated a logic flow of the method of the present invention. From top to bottom, we see that a request is received by either wireless or communication line method; the request is updated and sent via a smart label RF ID reader via wireless to interrogate RF ID tags or labels on inventory. An external reader may be used, i.e., remote from the shelf labels 38 and powered by utility current. The inventory tags respond and these responses are received by the RF ID reader, whereupon time stamp information, tag quantity information and shelf label location information to sent to the computer system 50 for data processing and updating of its database.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An inventory control and identification apparatus comprising: plural storage spaces, each holding at least one inventory item; each of the inventory items providing a radio frequency identification tag enabled for emitting a wireless identity transmission in response to an energy signal; each of the storage spaces further engaging an identification label having a label means for transceiving enabled for receiving the identity transmission of the associated identification tags and for transmitting time stamped label transmissions; a coordinate communication network having plural network means for transceiving and arranged in fixed positions relative to the storage spaces; and a means for data processing; the means for label transceiving, the means for network transceiving and the means for data processing enabled for mutual wave energy communication; the coordinate communication network enabled for receiving the time stamped label transmission at, at least three of the network means for transceiving and for identifying a time of receipt thereof; the data processing means enabled for receiving the transmitting and receipt times of the time stamped transmissions and for calculating locations and inventory quantities of the storage spaces by applying a triangulation method.

2. An inventory control and identification method comprising the steps of: placing inventory items, having radio frequency identification tags in a plurality of storage spaces; engaging, on each of the storage spaces, an identification label having a label means for transceiving enabled for receiving the identity transmission of the associated identification tags and further enabled for transmitting time stamped label transmissions; forming mutual wave energy communication between the means for label transceiving, a distributed means for network transceiving and a means for data processing; time stamping transmissions from the label means for transceiving; time stamping a time of receipt of the label transmissions at each of at least three points in the network transceiving means; and calculating locations of the inventory items by applying a triangulation method using the means for data processing.

* * * * *